US006980383B2

(12) United States Patent
Brunnett et al.

(10) Patent No.: US 6,980,383 B2
(45) Date of Patent: Dec. 27, 2005

(54) MONITORING OF PHENOMENA INDICATIVE OF PTP IN A MAGNETIC DISK DRIVE

(75) Inventors: Don Brunnett, Pleasanton, CA (US); Duc Banh, San Jose, CA (US); Jingbo Yu, San Jose, CA (US); Mark Heimbaugh, Pleasanton, CA (US); Suet Teo, San Jose, CA (US); Erhard Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/369,179

(22) Filed: Feb. 19, 2003

(65) Prior Publication Data

US 2004/0100255 A1    May 27, 2004

Related U.S. Application Data

(63) Continuation of application No. 10/173,578, filed on Jun. 18, 2002, now abandoned.

(60) Provisional application No. 60/298,968, filed on Jun. 18, 2001.

(51) Int. Cl.[7] .............................................. G11B 27/36
(52) U.S. Cl. ...................................................... 360/31
(58) Field of Search .................... 73/105, 104; 360/75, 360/25, 31

(56) References Cited

U.S. PATENT DOCUMENTS

| 5,594,595 | A | * | 1/1997 | Zhu ............................. 360/31 |
| 5,863,237 | A | * | 1/1999 | Felts et al. .................... 451/41 |
| 6,084,741 | A | * | 7/2000 | Kim ......................... 360/78.04 |
| 6,195,219 | B1 | * | 2/2001 | Smith .......................... 360/66 |
| 6,693,769 | B2 | * | 2/2004 | Hsu et al. ................... 360/126 |
| 2002/0036850 | A1 | * | 3/2002 | Lenny et al. ................. 360/31 |

* cited by examiner

Primary Examiner—David Hudspeth
Assistant Examiner—Daniell L. Negrón
(74) Attorney, Agent, or Firm—Myers Bigel Sibley & Sajovec, P.A.

(57) ABSTRACT

A PTP test subsystem of a magnetic disk drive identifies an undesired pole tip protrusion (PTP) condition, and takes steps to prevent problems associated with PTP. A PTP stressing mechanism stresses the disk drive during a PTP test mode to induce a PTP condition. A disk contact detection circuit detects when a head of the disk drive contacts the disk. A PTP write current determining circuit is also provided which comprises a write current level detector to ascertain a write current level at which the disk contact detection circuit detects when the head of the disk drive contacts the disk while the disk drive is stressed during the PTP test mode.

30 Claims, 6 Drawing Sheets

MONITORING OF PHENOMENA INDICATIVE OF PTP IN A MAGNETIC DISK DRIVE

RELATED APPLICATION DATA

Priority is hereby claimed to U.S. Provisional Application No. 60/298,968 filed Jun. 18, 2001, the content of which is hereby expressly incorporated by reference herein in its entirety.

COPYRIGHT NOTICE

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND OF THE INVENTION

1. Field of the Invention

The present invention, in certain respects, may relate to the manufacture of magnetic disk drives. In other respects, the present invention may relate to methods and systems for determining when a magnetic disk drive read/write head is subjected to undesired PTP and for taking corrective action.

2. Description of Background Information

Magnetic disk drives are being manufactured with increased access speeds and storage capacities. Manufacturers of these (present day and future) improved-performance magnetic disk drives have decreased the distance between the magnetic disk drive's read/write heads and its disk media. As a result, slight variations in the positioning or dimensions of the heads or of the disk media can cause the heads and the disk media to collide. For example, such a collision can be caused by protrusion of the pole tips of the write portion of a given read/write head, a phenomenon referred to as pole tip protrusion (PTP).

PTP happens when the disk head heats up causing part of the head's air bearing surface (ABS) to protrude and touch the disk. When this happens, a number of problems can result. Some such problems include off tracks, servo address mark (SAM) and gray code errors, head damage, and disk damage.

SUMMARY OF THE INVENTION

The present invention is provided to improve upon PTP detection systems and methods. This disclosure presents tools that can help disk manufacturers determine the occurrence of undesired PTP. Some of the tools presented capitalize on existing features of the magnetic disk drive; such existing features may comprise, for example, the processes provided in a typical magnetic disk drive read channel.

BRIEF DESCRIPTION OF THE DRAWINGS

The present invention is further described in the detailed description which follows, by reference to the noted drawings, by way of non-limiting exemplary embodiments, in which like reference numerals represent similar parts throughout the several views of the drawings, and wherein.

DETAILED DESCRIPTION

In the embodiments that follow, a magnetic disk drive is provided. That magnetic disk drive may comprise a unitary housing, and within that housing, a number of elements may be provided, including an input/output interface, a cache buffer memory, a controller, disk RAM, and disk ROM. In addition, the magnetic disk drive may have, within the same unitary housing, a spindle motor, a servo, disk media, and read/write heads. A motor control circuit is typically provided for controlling the spindle motor, and a servo control is typically provided for controlling the servo. In addition, read/write electronics and a read/write channel are each provided for facilitating the transfer of information to and from the disk media.

A magnetic disk drive may be provided, which contains a complete subsystem for determining when there is an undesired PTP in the write portion of a read/write head and for taking corrective action upon the indication of such an undesired PTP condition. The magnetic disk drive may contain, within its unitary housing, a mechanism for automatically causing the burnishing of the pole tips to prevent the further occurrence of the PTP condition for the given head from which it was detected. Alternatively, magnetic disk drives may be provided which contain the elements for identifying the presence of an undesired PTP condition for a given read/write head as a part of a test mode, and a corrective action system (e.g., a burnishing system) may be provided which is separate (or separable) from the magnetic disk drive, e.g., so such can be utilized only during the initial setup or manufacture of the magnetic disk drives. Such a corrective action system may be provided only for the manufacture of the magnetic disk drive, and may not be provided as part of the resulting magnetic disk drive after it is fully assembled.

Figure 1:
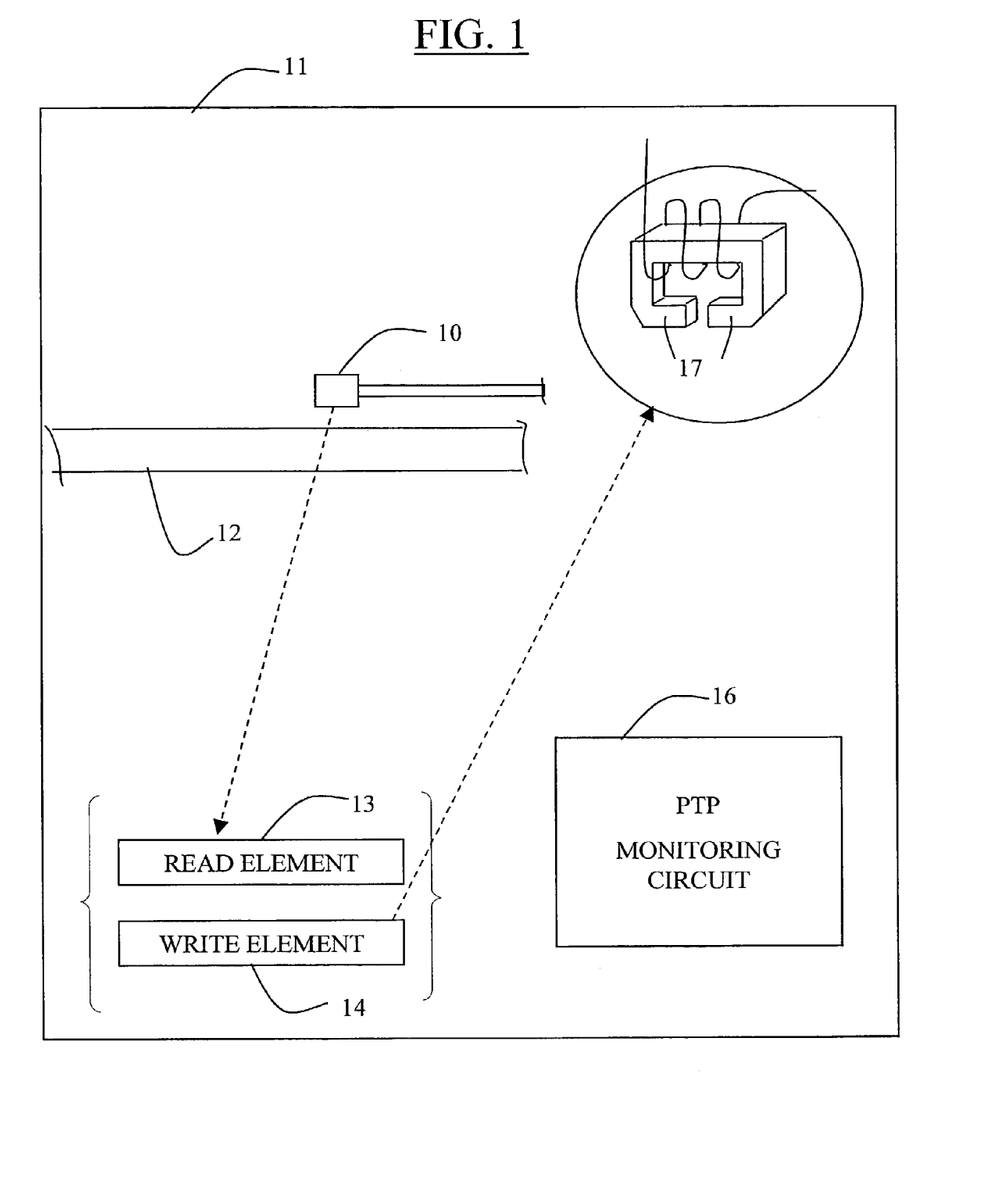
FIG. 1 is a schematic diagram illustrating certain elements of a magnetic disk drive, provided with a monitoring circuit for monitoring for PTP.

Referring now to the drawings in greater detail, FIG. 1 shows a magnetic disk drive having a unitary housing schematically depicted by a rectangle 11. Within the magnetic disk drive housing 11, disk media is provided, including a stack of disk platters (not shown). A given disk platter 12 is shown in the simplified diagram. For each side of a disk platter, a different read/write head 10 is provided. Each read/write head 10 may comprise a read element 13 and a write element 14. These elements are provided in some of the newer higher-performance magnetic disk drives which utilize a traditional U-shaped head for writing data onto the disk while using a magneto-resistive (MR) read element for reading data from the disk media. A PTP monitoring circuit 16 is provided.

FIG. 1 includes an enlarged portion which shows write element 14 comprising pole tips 17. Write element 14 comprises a U-shaped head made of conductive material. The U-shaped member is wrapped with coils of wire. A magnetic field is generated and transferred to the disk media in accordance with disk drive write signals that are passed through the coils. By changing the polarity of the electric current passed through the coils, the polarity of the field generated is also changed. The pattern of such magnetic conditions is transferred to the surface of the disk media on disk platter 12 to form a pattern which comprises the resulting encoded version of the data to be retrieved at a later point.

Poles 17 are positioned very close to the surface of disk platter 12, and are maintained at a specified distance from the surface of the disk platter 12 by an air bearing. If there is contact, or if the distance between the surface of the disk platter 12 and the pole tips 17 becomes unacceptably small, there can be problems with the disk. The head or the disk media can be damaged, and errors can be encountered when retrieving the data and reading the data from the disk media.

Such contact between the pole tips and the disk media occurs when there is pole tip protrusion. Pole tip protrusion (PTP) can be caused by high frequency writing which causes thermal expansion of the pole tips 17 due to, for example, the combined effects of eddy current heating and coil heating. Such PTP phenomena can cause problems while writing data onto the disk media, such as off track writing, due to frictional forces, as well as high servo PES (position error signal), because the pole tip is dragging the head. These effects could cause drive failure.

Figure 2:
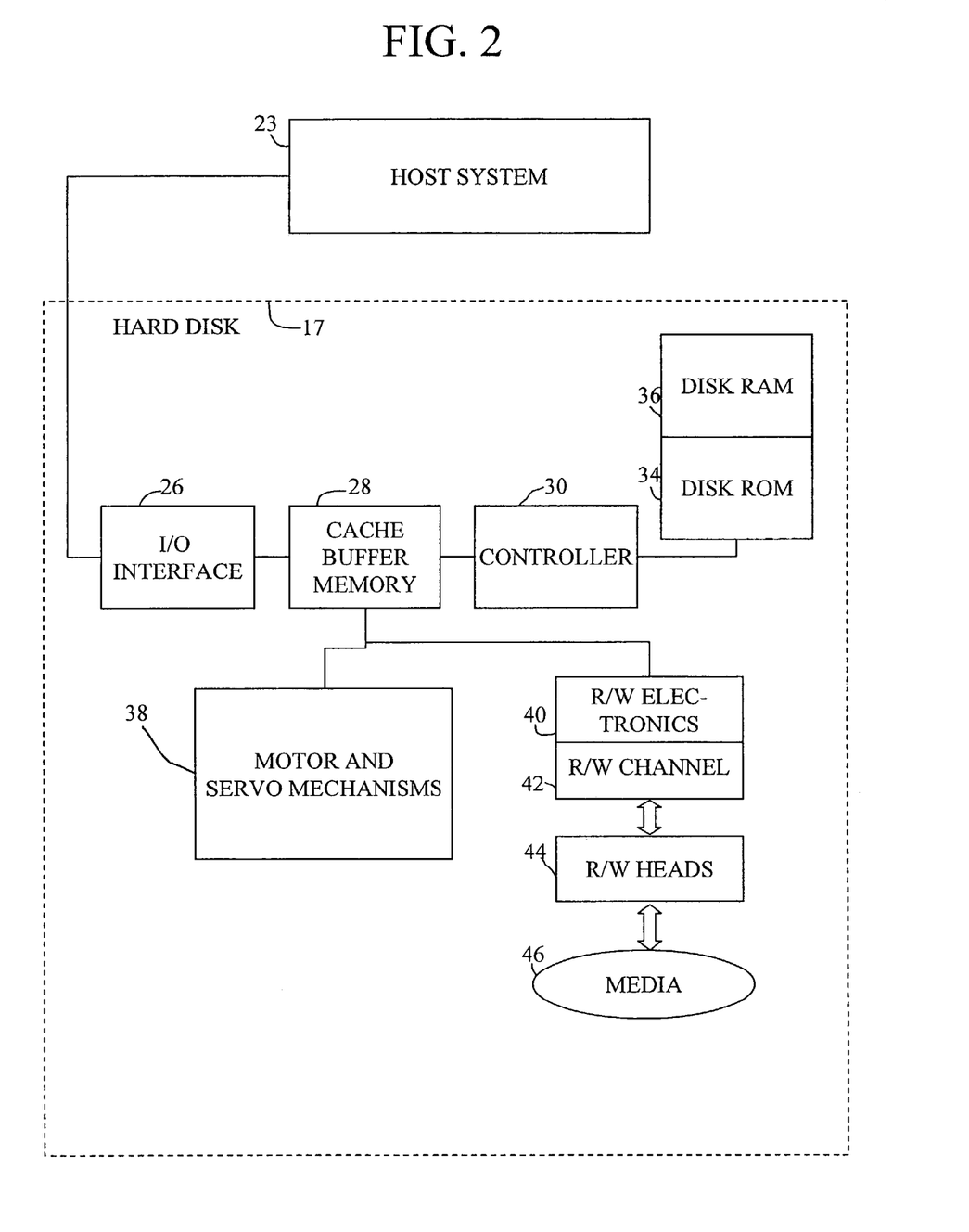
FIG. 2 is a block diagram of an embodiment of a computer system.

FIG. 2 is a block diagram of one embodiment of a personal computer system. The illustrated computer system has a magnetic disk drive 17. The illustrated magnetic disk drive 17 comprises, among other elements, disk media 46. In the illustrated embodiment, disk media 46 comprises magnetic media sputtered onto a metal substrate (the metal may be aluminum).

The illustrated computer system comprises a host system 23 and a magnetic disk drive 17. Magnetic disk drive 17 comprises a unitary magnetic disk drive housing which houses an input/output interface 26, a cache buffer memory 28, a controller 30, a RAM (random access memory) 36, and a ROM (read only memory) 34. Input/output interface 26 is connected to cache buffer memory 28, which is connected to controller 30. Each of the RAM and ROM portions 36, 34 is coupled to controller 30.

The magnetic disk drive housing further houses motor and servo mechanisms 38, read/write electronics 40, and a read channel 42. Read channel 42 is coupled to read/write heads 44, which interact with disk media 46. Read/write heads 44 and disk media 46 are also provided within the unitary magnetic disk drive housing (depicted with a schematic dotted line).

Input/output interface 26 may comprise a SCSI, IDE, or ADA interface, just to name a few examples. While a cache buffer memory 28 is not required, such is common.

In the embodiment, controller 22 serves as a control portion of the magnetic disk drive. Motor and servo control portions (not shown) of motor and servo mechanisms 38, read/write electronics 40, and read channel 42 collectively comprise hardware interaction circuitry coupling controller 30 to a head/disk assembly, which comprises a spindle motor (not shown), a servo (not shown), read/write heads 44, and disk media 46.

In the illustrated embodiment, magnetic disk drive 17, has in its housing, internal memory, including RAM 36 and ROM 34. All or a portion of such memory (and any other devices or mechanisms that may be provided in the magnetic disk drive and that serve as memory) may serve as the internal memory for the magnetic disk drive, and may contain information pertinent to the functions and operation of the magnetic disk drive.

Figure 3:
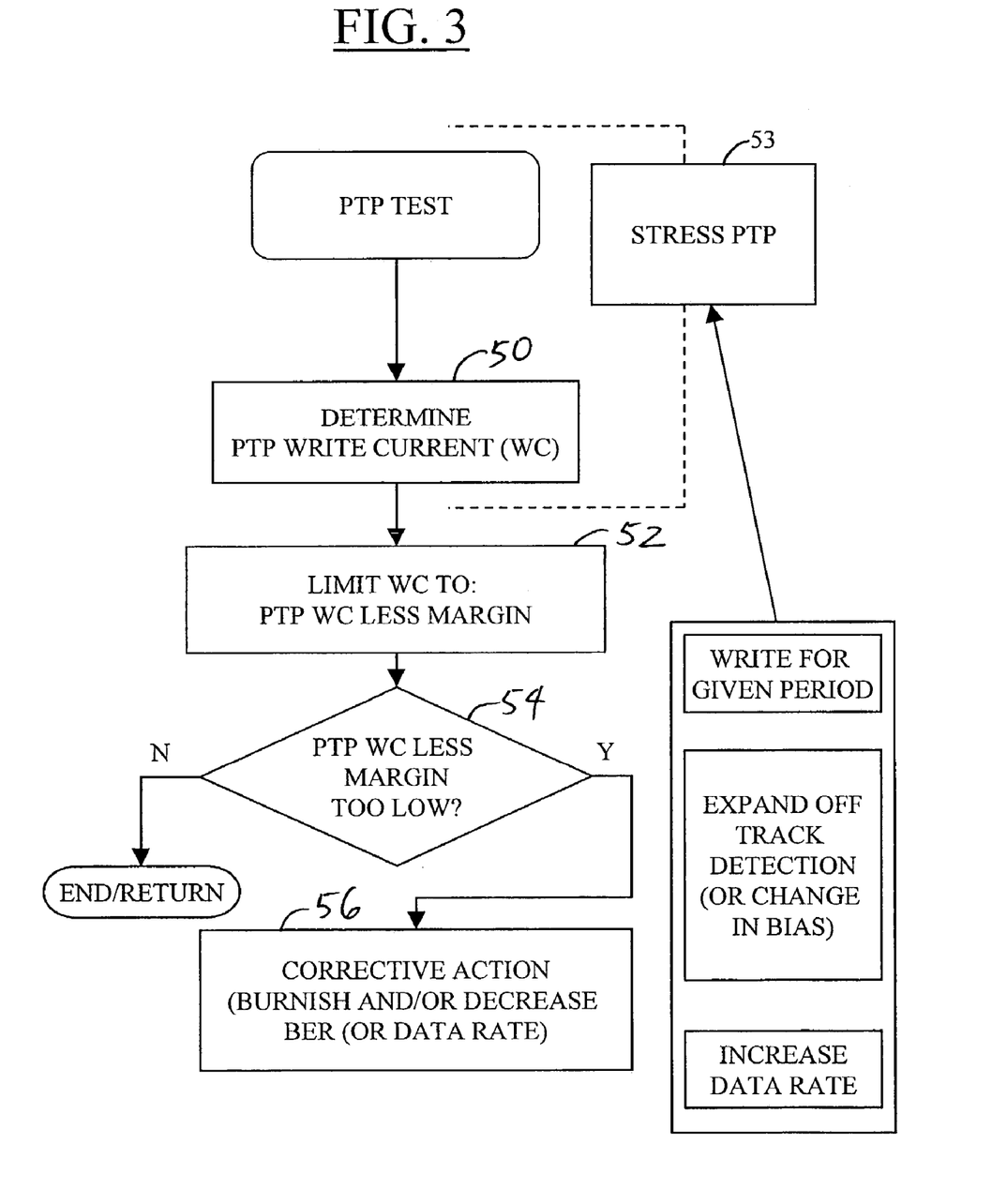
FIG. 3 is a flow chart of a PTP monitoring and correction process.

FIG. 3 is a flow chart of a PTP test process performed by the illustrated disk drive when it is in a PTP test mode. In an early act 50, the PTP write current (WC) is determined (by a process to be more fully explained below). The PTP WC is the WC at which head disk contact occurs due to PTP.

Then, in act 52, the write current (for normal disk drive operation, outside of the PTP test mode) is limited to a value equal to the PTP WC less a specified margin—to provide a "buffer" against undesired PTP in the disk drive. In act 54, a determination is made as to whether the PTP WC less the margin (the write current limit) is too low. This can be determined by checking if the BER (bit error rate) is unacceptable, a result of having a WC that is too low.

In act 56, if the write current limit was too low, corrective action is taken. In this act, the head is burnished and/or the data rate is decreased (thereby decreasing the BER).

The PTP WC is determined at act 50 while the disk drive is placed under a PTP stress condition—per act 53. This can be accomplished, e.g., by continuously writing for a given period of time, ideally with missing revolutions. Alternatively (or in addition), the track detection may be expanded (or the bias changed), to include time after the negation of the write gate (WG). This helps when the pole tip motion away from the disk is faster than the motion towards the disk. Another way to add PTP stress is to increase the data rate of the write operation.

Figure 4:
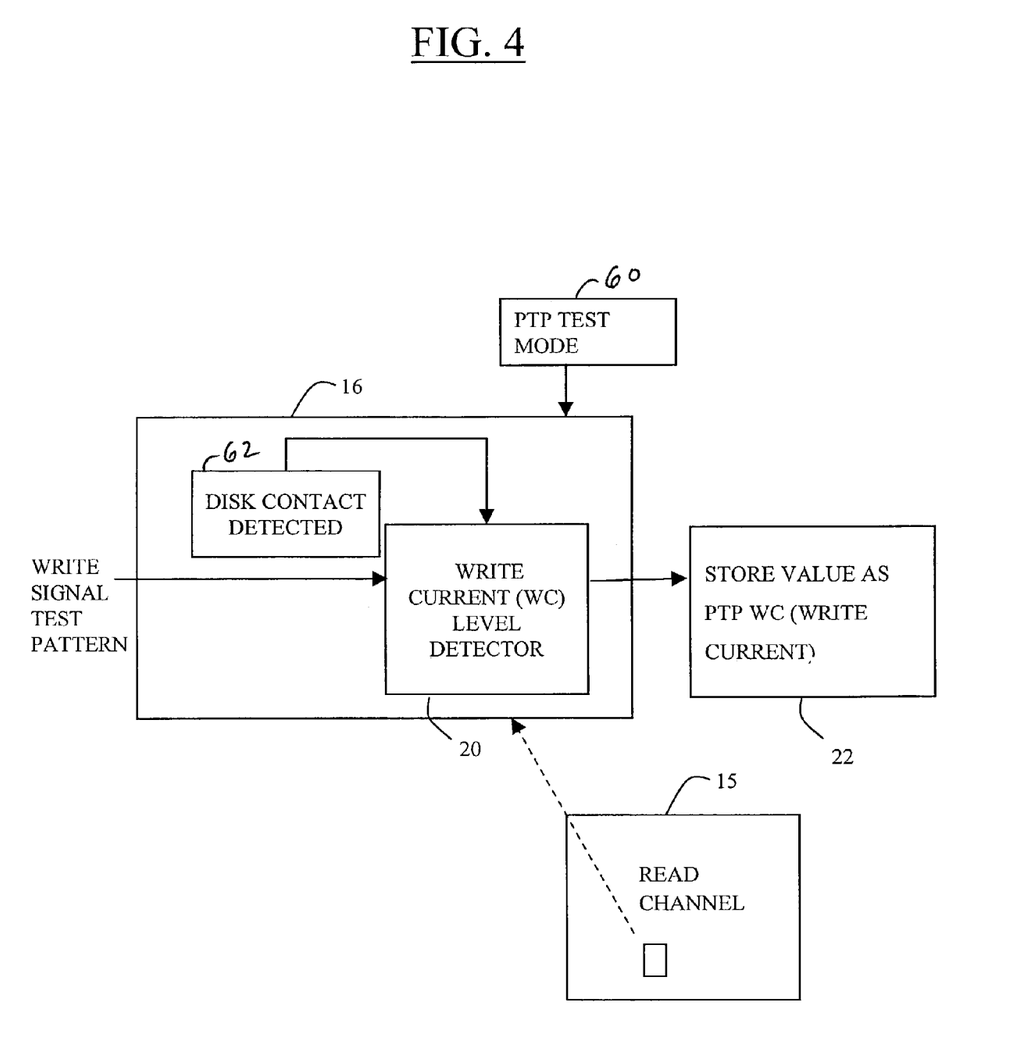
FIG. 4 is a block diagram of PTP monitoring circuit.

FIG. 4 shows a block diagram of a PTP monitoring circuit. The illustrated circuit 16 comprises a disk contact detection mechanism and a write current (WC) level detector 20. The circuit 16 is active when the drive is in a PTP test mode per an input 60. The WC level that occurs when the disk contact is detected due to an undesired PTP condition is stored at storage 22. As illustrated in FIG. 4, the PTP monitoring circuit 16 may be part of read channel 15.

Figure 5:
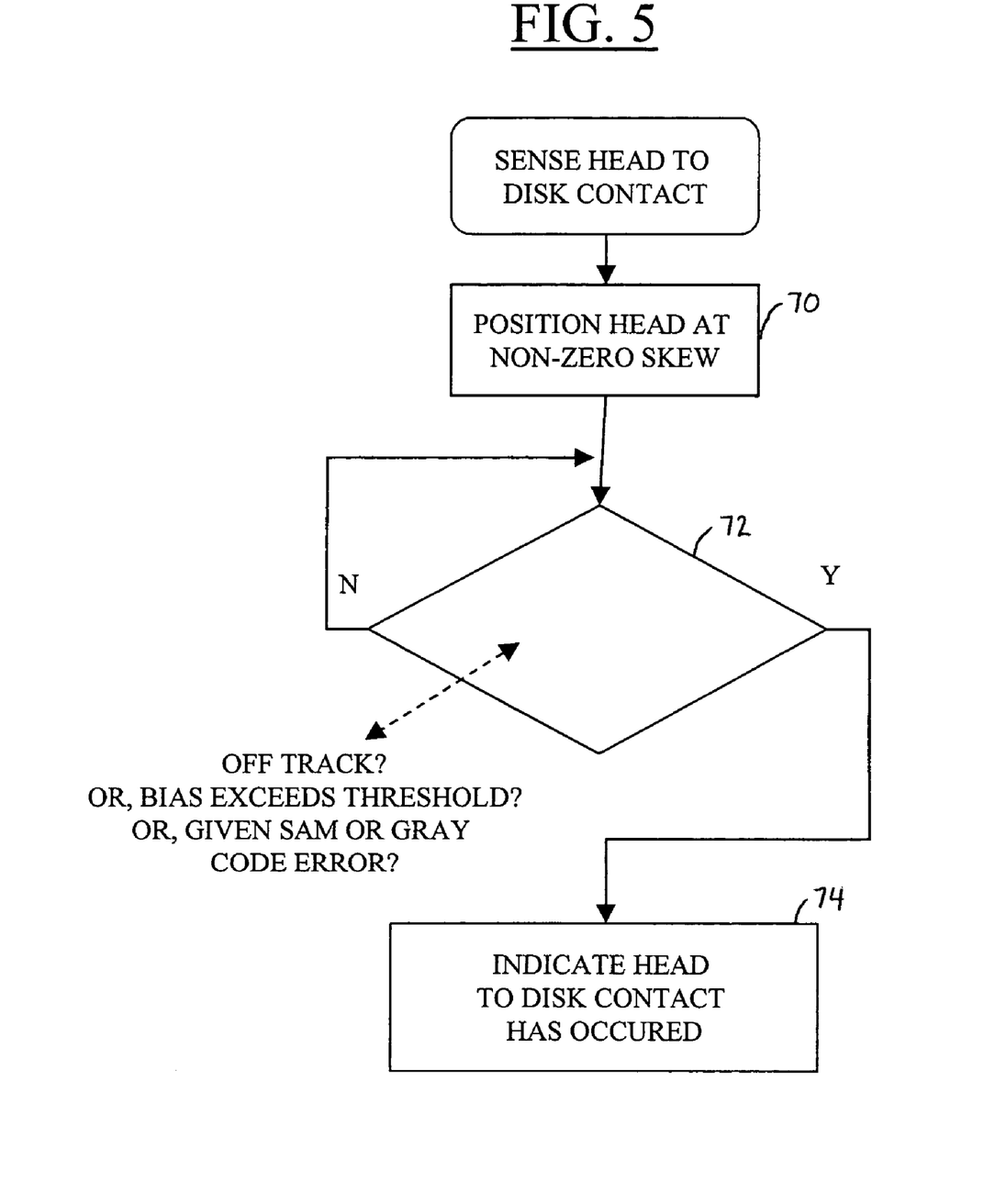
FIG. 5 is a flow chart of a process to sense the head to disk contact.

FIG. 5 is a flow chart of a process to sense head to disk contact. In an initial act 70, the head is positioned at a non-zero skew. At act 72, the process determines whether the head is off track, whether the bias exceeds a threshold, or whether there is a given SAM or gray code error. When one of the conditions checked in act 72 is met, in act 74, an indication is made that a head to disk contact has occurred.

Figure 6:
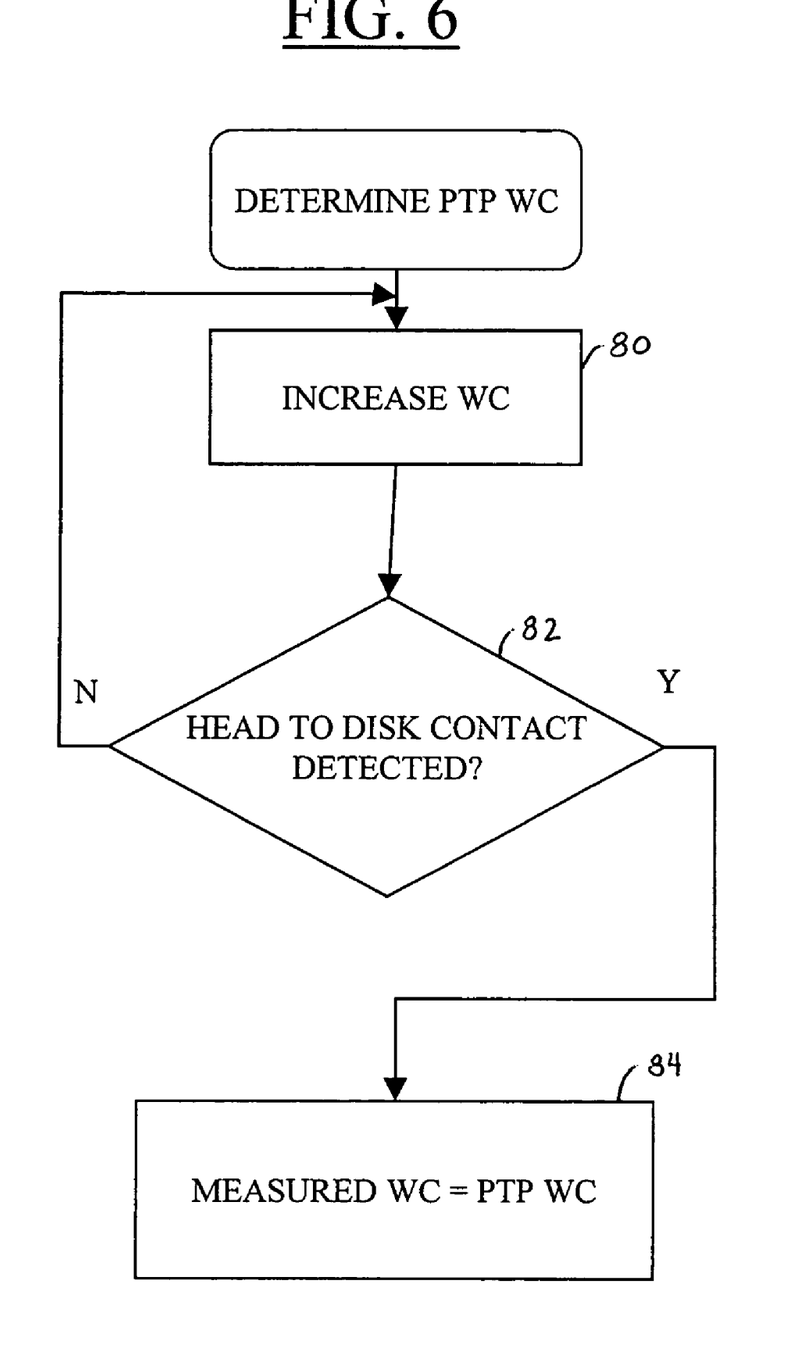
FIG. 6 is a flow chart of a process to determine the PTP WC.

FIG. 6 is a flow chart of a process to determine the PTP WC. In act 80, the WC is increased. In act 82, a determination is made as to whether a head to disk contact had been detected. When such contact has been detected, the process proceeds to act 84. In act 84, the measured write current (WC) is deemed the PTP WC.

While the invention has been described with reference to certain illustrated embodiments, the words which have been used herein are words of description, rather than words of limitation. Changes may be made, within the purview of the appended claims, without departing from the scope or spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A pole tip protrusion (PTP) test subsystem of a magnetic disk drive for identifying an undesired PTP condition of a head in the disk drive, the subsystem comprising:
    a PTP stressing mechanism that stresses the head during a PTP test mode to induce a PTP condition, wherein the PTP stressing mechanism increases a data rate of a write operation during the PTP test mode;
    a disk contact detection circuit that detects when the head contacts a disk of the disk drive;

a PTP write current determination circuit that determines a PTP write current level at which the head contacts the disk while the head is stressed during the PTP test mode;

a write current limiting mechanism that limits the write current level to a write current limit equal to the determined PTP write current level less a specified margin to provide a buffer against undesired PTP of the head;

a write current limit determination mechanism that determines when the write current limit is too low; and a corrective action mechanism that takes corrective action when the write current limit is too low, wherein the corrective action comprises burnishing the head.

2. The PTP test subsystem according to claim 1, further comprising a PTP test activation mechanism that responds to a given triggering event to place the PTP test subsystem in the PTP test mode.

3. The PTP test subsystem according to claim 1, wherein the PTP stressing mechanism comprises a stress level writing control mechanism that writes through the head onto the disk continuously for a given period of time.

4. A pole tip protrusion (PTP) test subsystem of a magnetic disk drive for identifying an undesired PTP condition of a head in the disk drive, the subsystem comprising:

a PTP stressing mechanism that stresses the head during a PTP test mode to induce a PTP condition, wherein the PTP stressing mechanism increases a data rate of a write operation during the PTP test mode;

a disk contact detection circuit that detects when the head contacts a disk of the disk drive;

a PTP write current determination circuit that determines a PTP write current level at which the head contacts the disk while the head is stressed during the PTP test mode;

a write current limiting mechanism that limits the write current level to a write current limit equal to the determined PTP write current level less a specified margin to provide a buffer against undesired PTP of the head;

a write current limit determination mechanism that determines when the write current limit is too low; and a corrective action mechanism that takes corrective action when the write current limit is too low, wherein the corrective action comprises decreasing the data rate of a write operation when not in the PTP test mode.

5. The PTP test subsystem according to claim 4, wherein the disk contact detection circuit comprises:

a non-zero position positioning mechanism that positions the head at a non-zero skew;

a contact detection mechanism that detects a contact parameter; and a disk contact indicator that generates an indication of head to disk contact when the contact parameter is detected.

6. The PTP test subsystem according to claim 5, wherein the contact detection mechanism comprises a mechanism to detect when the head is off track a threshold amount.

7. The PTP test subsystem according to claim 5, wherein the contact detection mechanism comprises a mechanism to detect when a bias exceeds a threshold.

8. The PTP test subsystem according to claim 5, wherein the contact detection mechanism comprises a mechanism to detect when a given servo address mark (SAM) is detected.

9. The PTP test subsystem according to claim 5, wherein the contact detection mechanism comprises a mechanism to detect when a given gray code error is detected.

10. A pole tip protrusion (PTP) test subsystem of a magnetic disk drive for identifying an undesired PTP condition of a head in the disk drive, the subsystem comprising:

a PTP stressing mechanism that stresses the head during a PTP test mode to induce a PTP condition, wherein the PTP stressing mechanism increases a data rate of a write operation during the PTP test mode;

a disk contact detection circuit that detects when the head contacts a disk of the disk drive;

a PTP write current determination circuit that determines a PTP write current level at which the head contacts the disk while the head is stressed during the PTP test mode;

a write current limiting mechanism that limits the write current level to a write current limit equal to the determined PTP write current level less a specified margin to provide a buffer against undesired PTP of the head;

a write current limit determination mechanism that determines when the write current limit is too low; and a corrective action mechanism that takes corrective action when the write current limit is too low, wherein the corrective action comprises decreasing the bit error rate (BER) of a write operation when not in the PTP test mode.

11. A magnetic disk drive comprising:

an input/output interface configured to receive data from a host system;

read/write electronics;

a read/write channel;

a magnetic disk;

a head configured to read and write data on the disk;

a controller configured to write data received by the input/output interface onto the disk through the read/write electronics, the read/write channel, and the head, and configured to read data from the disk through the head, the read/write channel, and the read/write electronics; and a pole tip protrusion (PTP) test subsystem configured to identify an undesired PTP condition of the head, the PTP test subsystem comprising:

a PTP stressing mechanism that stresses a head of the disk drive during a PTP test mode to induce a PTP condition, wherein the PTP stressing mechanism increases a data rate of a write operation during the PTP test mode;

a disk contact detection circuit that detects when the head contacts a disk of the disk drive;

a PTP write current determination circuit that determines a PTP write current level at which the head contacts the disk while the head is stressed during the PTP test mode;

a write current limiting mechanism that limits the write current level to a write current limit equal to the determined PTP write current level less a specified margin to provide a buffer against undesired PTP of the head;

a write current limit determination mechanism that determines when the write current limit is too low; and a corrective action mechanism that takes corrective action when the write current limit is too low, wherein the corrective action comprises burnishing the head.

12. The magnetic disk drive according to claim 11, wherein the disk contact detection circuit comprises:

a non-zero position positioning mechanism that positions the head at a non-zero skew;

a contact detection mechanism that detects a contact parameter; and a disk contact indicator that generates an indication of head to disk contact when the contact parameter is detected.

13. The magnetic disk drive according to claim 12, wherein the contact detection mechanism comprises a mechanism to detect when the head is off track a threshold amount.

14. The magnetic disk drive according to claim 12, wherein the contact detection mechanism comprises a mechanism to detect when a bias exceeds a threshold.

15. The magnetic disk drive according to claim 12, wherein the contact detection mechanism comprises a mechanism to detect when a given servo address mark (SAM) is detected.

16. The magnetic disk drive according to claim 12, wherein the contact detection mechanism comprises a mechanism to detect when a given gray code error is detected.

17. A magnetic disk drive comprising:
an input/output interface configured to receive data from a host system;
read/write electronics;
a read/write channel;
a magnetic disk;
a head configured to read and write data on the disk;
a controller configured to write data received by the input/output interface onto the disk through the read/write electronics, the read/write channel, and the head, and configured to read data from the disk through the head, the read/write channel, and the read/write electronics; and
a pole tip protrusion (PTP) test subsystem configured to identify an undesired PTP condition of the head, the PTP test subsystem comprising:
a PTP stressing mechanism that stresses a head of the disk drive during a PTP test mode to induce a PTP condition, wherein the PTP stressing mechanism increases a data rate of a write operation during the PTP test mode;
a disk contact detection circuit that detects when the head contacts a disk of the disk drive;
a PTP write current determination circuit that determines a PTP write current level at which the head contacts the disk while the head is stressed during the PTP test mode;
a write current limiting mechanism that limits the write current level to a write current limit equal to the determined PTP write current level less a specified margin to provide a buffer against undesired PTP of the head;
a write current limit determination mechanism that determines when the write current limit is too low; and
a corrective action mechanism that takes corrective action when the write current limit is too low, wherein the corrective action comprises decreasing the data rate of a write operation when not in the PTP test mode.

18. The magnetic disk drive according to claim 17, the PTP test subsystem further comprising a PTP test activation mechanism that responds to a given triggering event to place the PTP test subsystem in the PTP test mode.

19. The magnetic disk drive according to claim 17, wherein the PTP stressing mechanism comprises a stress level writing control mechanism that writes through the head onto the disk continuously for a given period of time.

20. A magnetic disk drive comprising:
an input/output interface configured to receive data from a host system;
read/write electronics;
a read/write channel;
a magnetic disk;
a head configured to read and write data on the disk;
a controller configured to write data received by the input/output interface onto the disk through the read/write electronics, the read/write channel, and the head, and configured to read data from the disk through the head, the read/write channel, and the read/write electronics; and
a pole tip protrusion (PTP) test subsystem configured to identify an undesired PTP condition of the head, the PTP test subsystem comprising:
a PTP stressing mechanism that stresses a head of the disk drive during a PTP test mode to induce a PTP condition, wherein the PTP stressing mechanism increases a data rate of a write operation during the PTP test mode;
a disk contact detection circuit that detects when the head contacts a disk of the disk drive;
a PTP write current determination circuit that determines a PTP write current level at which the head contacts the disk while the head is stressed during the PTP test mode;
a write current limiting mechanism that limits the write current level to a write current limit equal to the determined PTP write current level less a specified margin to provide a buffer against undesired PTP of the head;
a write current limit determination mechanism that determines when the write current limit is too low; and
a corrective action mechanism that takes corrective action when the write current limit is too low, wherein the corrective action comprises decreasing the bit error rate (BER) of a write operation when not in the PTP test mode.

21. A method for identifying pole tip protrusion (PTP) of a head in a disk drive, the method comprising:
stressing the head during a PTP test mode to induce a PTP condition by increasing a data rate of a write operation during the PTP test mode;
detecting when the head contacts a disk of the disk drive;
determining a PTP write current level at which the head contacts the disk while the head is stressed during the PTP test mode;
limiting write current level to a write current limit equal to the determined PTP write current level less a specified margin to provide a buffer against undesired PTP of the head; and
determining when the write current limit is too low and, responsive to determining the write current is too low, taking corrective action by burnishing the head.

22. A method for identifying pole tip protrusion (PTP) of a head in a disk drive, the method comprising:
stressing the head during a PTP test mode to induce a PTP condition by increasing a data rate of a write operation during the PTP test mode;
detecting when the head contacts a disk of the disk drive;
determining a PTP write current level at which the head contacts the disk while the head is stressed during the PTP test mode;
limiting write current level to a write current limit equal to the determined PTP write current level less a specified margin to provide a buffer against undesired PTP of the head; and
determining when the write current limit is too low and, responsive to determining the write current is too low, taking corrective action by decreasing the data rate of a write operation when not in the PTP test mode.

23. A method for identifying pole tip protrusion (PTP) of a head in a disk drive, the method comprising:
   stressing the head during a PTP test mode to induce a PTP condition by increasing a data rate of a write operation during the PTP test mode;
   detecting when the head contacts a disk of the disk drive;
   determining a PTP write current level at which the head contacts the disk while the head is stressed during the PTP test mode;
   limiting write current level to a write current limit equal to the determined PTP write current level less a specified margin to provide a buffer against undesired PTP of the head; and
   determining when the write current limit is too low and, responsive to determining the write current is too low, taking corrective action by decreasing the BER of a write operation when not in the PTP test mode.

24. The method according to claim 23, wherein detecting when the head contacts a disk of the disk drive comprises:
   positioning the head at a non-zero skew;
   detecting a contact parameter; and
   generating an indication of head to disk contact when the contact parameter is detected.

25. The method according to claim 24, wherein detecting a contact parameter comprises detecting when the head is off track a threshold amount.

26. The method according to claim 24, wherein detecting a contact parameter comprises detecting when a bias exceeds a threshold.

27. The method according to claim 24, wherein detecting a contact parameter comprises detecting when a given servo address mark (SAM) is detected detecting.

28. The method according to claim 24, wherein detecting a contact parameter comprises detecting when a given gray code error is detected.

29. The method according to claim 23, further comprising placing the PTP test subsystem into the PTP test mode in response to a given a triggering event.

30. The method according to claim 23, wherein stressing the head during a PTP test mode to induce a PTP condition comprises writing through the head onto the disk continuously for a given period of time.

* * * * *